Sept. 25, 1945.  F. G. SILVA ET AL  2,385,734
CLUTCH OPERATING MEANS
Original Filed Oct. 11, 1941  4 Sheets-Sheet 1
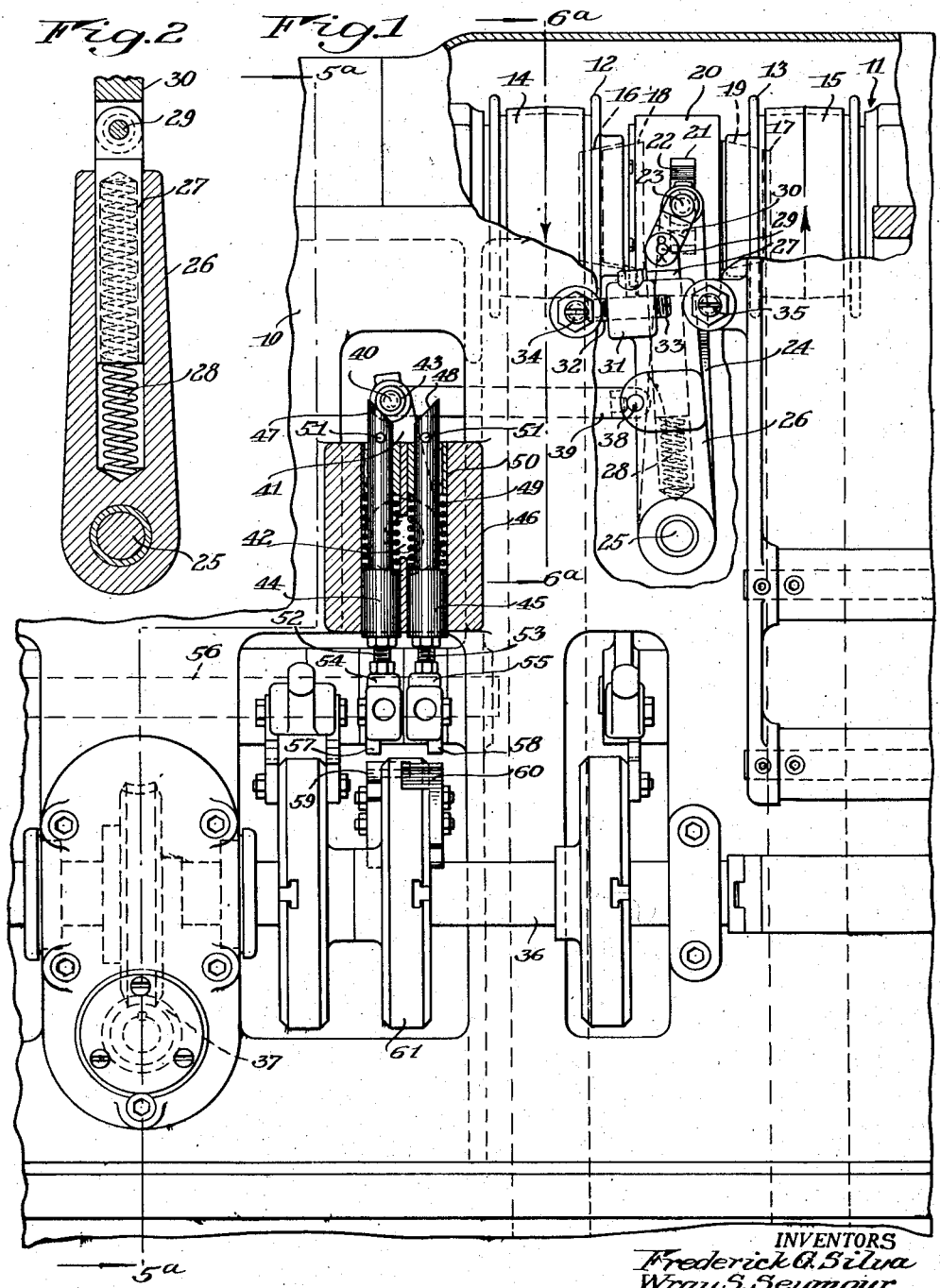
INVENTORS
Frederick G. Silva
Wray S. Seymour
BY
Edward H. Cumpston
their Attorney

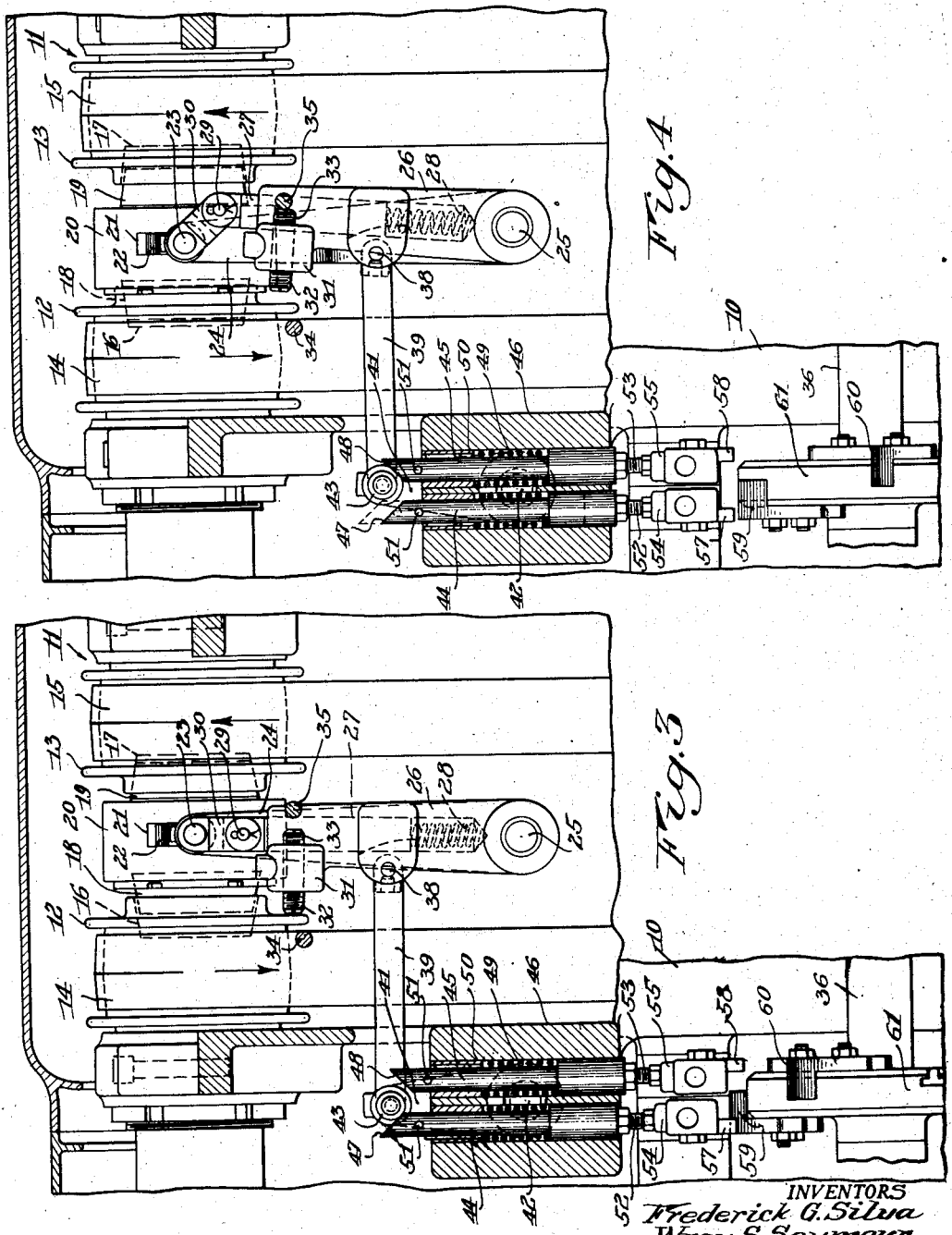

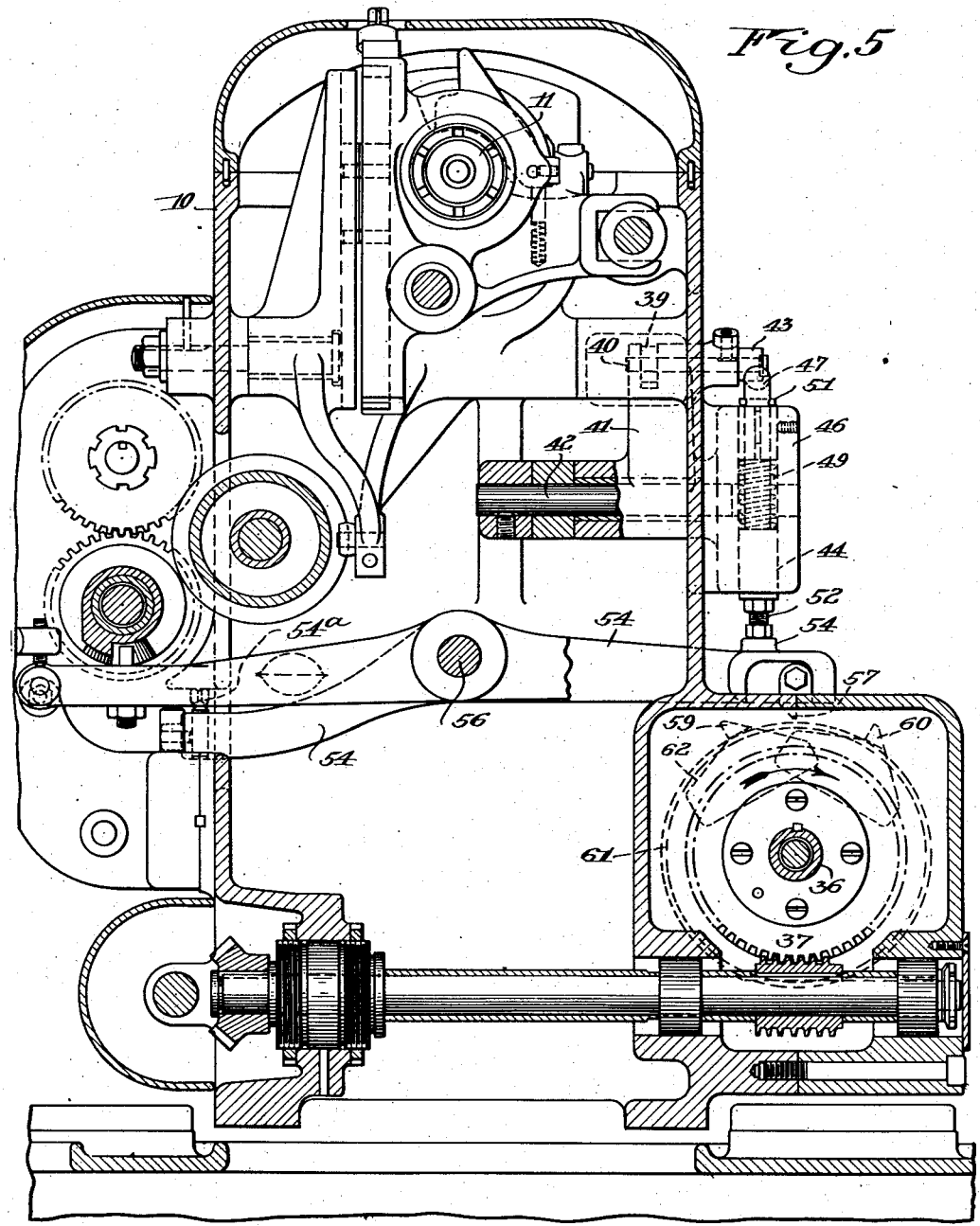

Sept. 25, 1945.　　　F. G. SILVA ET AL　　　2,385,734
CLUTCH OPERATING MEANS
Original Filed Oct. 11, 1941　　4 Sheets-Sheet 4
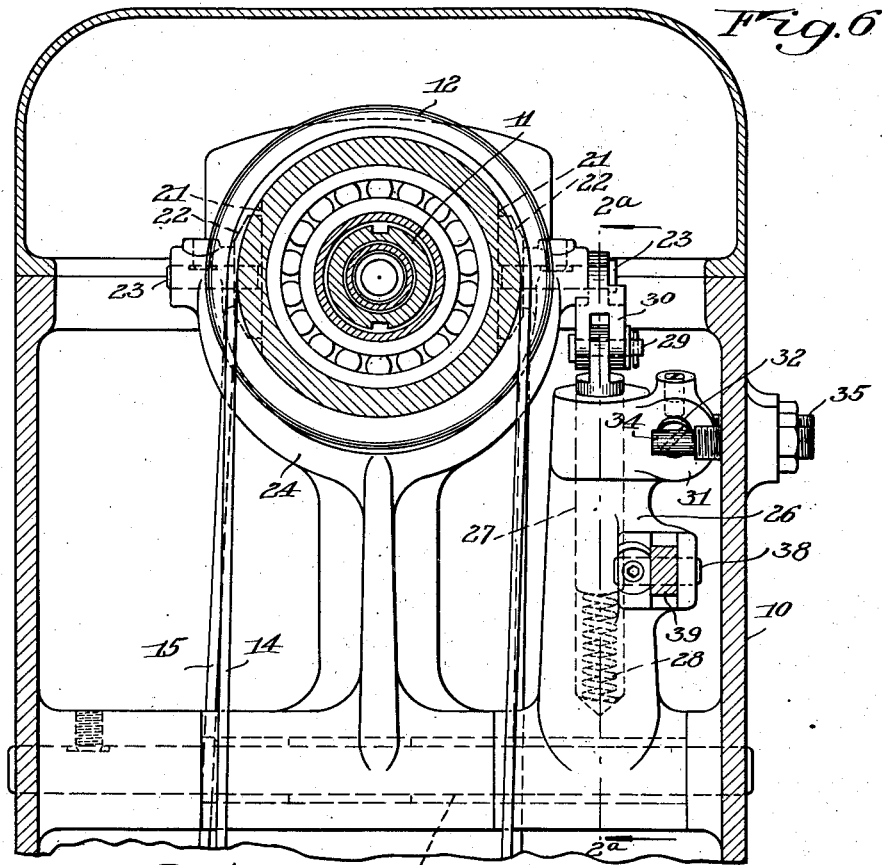
Fig. 6
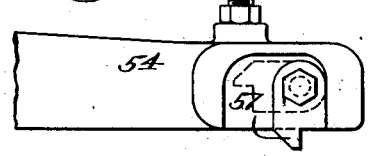
Fig. 7
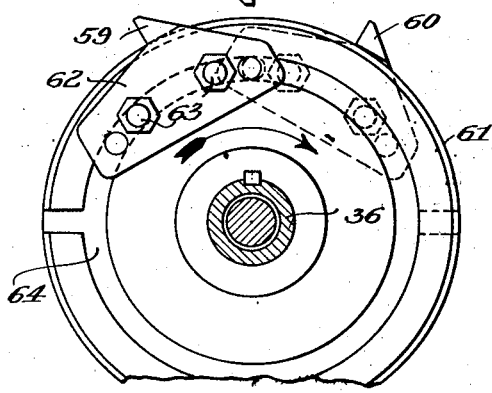
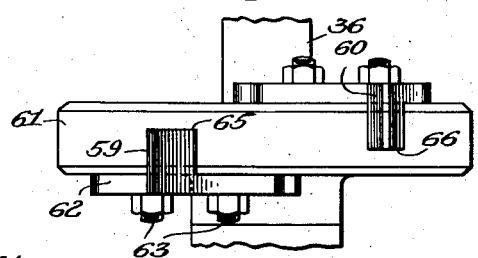
Fig. 8
INVENTORS
Frederick G. Silva
Wray S. Seymour
BY
Edward H. Cumpston
their Attorney Patented Sept. 25, 1945

2,385,734

UNITED STATES PATENT OFFICE 2,385,734

CLUTCH OPERATING MEANS

Frederick G. Silva and Wray S. Seymour, Rochester, N. Y., assignors to Davenport Machine Tool Co., Inc., Rochester, N. Y., a corporation of New York Original application October 11, 1941, Serial No. 414,626. Divided and this application January 13, 1944, Serial No. 518,110

12 Claims. (Cl. 192—51)

This invention relates to means for operating a control device, such as a clutch, for reversing the rotation of a machine spindle. In machines having reversible rotary operating spindles, it is often important to be able to effect such reversal with extreme rapidity, as in the case, for example, of the work spindle of an automatic screw machine in which the successive operations of the turret and cross slides are precisely coordinated for rapidity of operation and a high rate of production. One object of the present invention is to provide an improved mechanism for operating the clutch means for reversing the direction of rotation of such a spindle.

Another object is to provide such a mechanism is a more simple, readily adjustable and convenient form of construction, capable of operating in a more rapid and reliable manner.

Another object is the provision of an improved mechanism of the character described, particularly adapted for actuation by the trip dog carrier shaft of an automatic screw machine, for effecting reversal of the work spindle driving means.

A further object is to supply a mechanism such as described having an improved form of adjustable control means with positive provision for obstructing any adjustment of the same to positions capable of causing interference or clashing and injury of the parts of the mechanism.

To these and other ends the invention resides in certain improvements and combinations of parts, all as will be hereinafter more fully described, the novel features being pointed out in the claims at the end of the specification.

In the drawings:

Fig. 1 is an elevation of portions of the front side of an automatic screw machine comprising a clutch operating means embodying the present invention;

Fig. 2 is an enlarged, sectional view of parts of such clutch operating means taken on line 2a—2a in Fig. 6;

Fig. 3 is a view similar to Fig. 1, but with the parts moved to a position to initiate a shifting operation;

Fig. 4 is a similar view showing the position of the parts at the end of a shifting operation;

Fig. 5 is a sectional elevation transversely of the machine substantially on the line 5a—5a in Fig. 1;

Fig. 6 is an enlarged, transverse section of part of the machine substantially on the line 6a—6a in Fig. 1;

Fig. 7 is an enlarged end view of the trip dog carrier shaft as seen from the left in Fig. 1, and Fig. 8 is a top plan view of the trip dog carrier shown in Fig. 7.

The invention is disclosed in the present instance, by way of illustration, as applied to the control of the rotary work spindle of an automatic screw machine, such as disclosed in our co-pending patent application, Serial No. 414,626, of which the present application is a division. The machine has a frame, indicated generally at 10, on which is mounted a work spindle, indicated generally at 11, Figs. 1 and 6. Rotatably mounted on roller bearings on the spindle are spaced pulleys, 12 and 13, driven in opposite directions at suitable speeds, by belts, 14 and 15, respectively, running to any known or suitable motor or other driving means (not shown). Each pulley is formed at the end thereof adjacent the other pulley with a cone clutch surface, 16 and 17, respectively, with which cooperate a pair of cone clutch faces, 18 and 19, respectively, on a clutch member splined to the work spindle and suitably connected with a clutch member 20, which is shiftable longitudinally of the spindle to clutch the same to either of the driving pulleys and reverse the direction of rotation of the spindle, as well understood in the art.

For such shifting of the clutch, the member 20 is formed on opposite sides with channels 21, in which shoes 22 are slidably engaged, and the shoes are pivotally carried by spindles 23, fixed in the forked ends of a shipper lever 24, pivotally mounted on a spindle 25, fixed in suitable bearings in the frame of the machine.

The means for shifting the shipper lever 24 to unclutch one driving pulley and clutch the other, comprises a spring actuated plunger device operable to effect such shifting with extreme rapidity. Such device comprises a hollow, sleeve-like lever 26, Fig. 2, pivoted at its lower end on spindle 25, with its free end extending upwardly, as shown. Sliding longitudinally in the hollow outer end of the lever is a hollow plunger 27, in the bore of which and in lever 26 is housed a coiled compression spring 28, normally urging plunger 27 upwardly and outwardly of lever 26. The upper end of the plunger beyond the lever is pivotally connected, as by means of a pivoted pin 29, with the lower end of a link 30, the upper end of which is pivotally mounted on the forward end of spindle 23 of the shipper lever. Lever 26 has a boss 31 formed with openings in which a pair of opposing studs 32 and 33 are threadedly and adjustably supported for engagement with a pair of studs 34 and 35, respectively, fixed in the frame of the machine and serving as stops to adjustably limit the rocking of lever 26.

It will be apparent from the above construction that when lever 26 is in either of its extreme positions, resting against either of the stops 34 or 35, its link 30 occupies an inclined position, as shown in Fig. 1, in which spring 28, forcing plunger 27 outwardly, actuates its inclined link 30, to move clutch member 20 to clutch one of the pulleys to the spindle, pulley 13 being so clutched in the position of the parts shown in Fig. 1. As lever 26 is shifted toward and past its central position, link 30 straightens and is eventually inclined in the opposite direction and drives clutch member 20 to unclutch pulley 13 and clutch pulley 12 to the spindle. As soon as link 30 passes its central position during such movement of lever 26, the pressure of spring 28 operates to complete such movement of the parts and shifting of the clutch member 20 with extreme rapidity.

The shipper lever 24 and its operating lever 26 are actuated by connection with the trip dog carrier shaft 36, extending along the front of the machine and rotated by a worm and worm gear connection, indicated generally at 37, with the motive power of the machine. To this end, lever 26 has pivotally connected thereto, as at 38, a link 39, the other end of which is pivotally connected with a spindle 40, mounted in the end of a lever 41, Fig. 5, pivotally mounted for rocking movement on a spindle 42, fixed in the frame of the machine. The outer end of spindle 40 carries an abutment in the form of a rotatable roller 43, which is engaged and actuated to shift the clutch by the opposed faces of a cam device, which will now be described.

The cam device for shifting the clutch comprises, preferably, a pair of thrust elements, or rods, 44 and 45, mounted to slide longitudinally in spaced, side-by-side relation in bores in and extending through a supporting housing 46, on the frame of the machine. Thrust rods 44 and 45 are thus mounted for longitudinal sliding movement in a direction which is perpendicular to the pivotal axis of the shipper lever, as shown, and the rods are formed at their upper ends with cam faces 47 and 48, inclined to their longitudinal axes and in opposing relation to each other, for engagement from opposite sides with the roller abutment 43.

The major portion of each rod 44 and 45 is smaller in diameter than the bore in housing 46 in which it is mounted, so as to provide a chamber about each rod in which is confined a coiled compression spring 49, bearing at one end against the lower shouldered end of the rod and, at the other, against a sleeve 50 fixed in the chamber in the housing and in which the rod is keyed to slide. Each rod carries in its end above the housing a transverse pin 51, the projecting ends of which serve as stops for limiting the downward movement of the rod. Each of the rods has a stud, 52 and 53, respectively, threadedly and adjustably mounted in its lower end below the housing and serving as an actuating means, as hereafter described. It will be apparent from this construction that either rod may be thrust upwardly, in its bearing in the housing, by means hereafter described, to bring its inclined upper end into camming engagement with abutment 43, to move the latter in a generally horizontal direction to shift the shipper lever.

The means for alternately actuating the thrust or cam rods, 44 and 45, comprises, preferably, a pair of arms, 54 and 55, respectively, Figs. 1, 5 and 7, pivotally mounted on a central shaft 56 of the machine. Each of the arms, which are the same, except for being of different hand, has fixed on its inner end, Fig. 5, an adjustable stop, or set screw 54a, for engagement with the machine frame, as shown, and has on its outer end an inclined lug, 57 and 58, respectively, arranged for cooperation with the oppositely inclined surfaces of corresponding dogs, 59 and 60, on a carrier wheel 61, rotated by shaft 36. Dog 59 is carried by a plate 62, Fig. 7, lying against a side face of carrier 61 and adjustably fixed thereto, by means of bolts 63 engaged in a peripheral T-slot 64, formed in the side face of the carrier. The dog 59 is thus arranged for adjustment peripherally of the carrier, in line for engagement with lug 57 of arm 54, and the dog is extended across the periphery of the carrier somewhat beyond its center line, as shown at 65. Dog 60 is similarly attached for peripheral adjustment on the opposite face of the carrier, by similar means, and is extended across the center line of the carrier periphery, as at 66, so as to overlap the extension of dog 59. Such overlapping of the dogs provides for engagement with one another, so as to prevent them from being positioned in alinement with one another axially of the carrier and thus insure the successive actuation of the thrust rods at a sufficient interval, one after another, to prevent the rods from interfering with one another in the actuation of the roller 43 and other clashing and injury of any of the parts of the mechanism.

In operation, the dogs 59 and 60 are suitably adjusted and fixed on the carrier for shifting the shipper lever at the desired time intervals. Thus, the parts are shown in Fig. 1 with the clutch shifted toward the right to clutch pulley 13 to the spindle, the lever 26 being inclined toward the left with the abutment 43 over the rod 44. At the desired time, dog 59 engages lug 57, raises arm 54 and rod 44, as shown in Fig. 3, thus camming abutment 43 toward the right until lever 26 passes its central position, after which it snaps over toward the right, as shown in Fig. 4, shifting the clutch member toward the left and clutching in pulley 12, rod 45 being in lowered position, as shown, during such actuation. At the proper time interval, dog 60 raises arm 55 and rod 45 to shift the clutch in the opposite direction.

The invention thus provides a simple, compact and practical mechanism for operating the clutch from the trip dog carrier shaft. The mechanism for alternately raising the cam or thrust rods 44 and 45 is readily adjustable, through a wide range of operations, in a positive and rapid manner. The combination of such dog actuated camming means with the spring actuated means for throwing the shipper lever from one position to another, produces a mechanism operating in a highly positive and rapid manner. Furthermore, the various parts are readily accessible for convenient adjustment, and the carrier dogs are so constructed as to prevent any improper positioning tending to lock and injure the parts.

The invention thus accomplishes its objects and while it has been disclosed by reference to particular details of a preferred embodiment, it is to be understood that such disclosure is intended in an illustrative, rather than a limiting sense, as it is contemplated that various modifications and changes in the construction and arrangement of the parts will readily occur to those skilled in the art within the spirit of the invention and the scope of the appended claims.

We claim:

1. In a machine having a spindle provided with means for rotating the same in opposite directions including a shipper lever for selectively connecting said means and spindle, the combination with said shipper lever of a link member pivoted thereto, a pivotally supported lever member, a part slidably mounted on one of said members and pivotally connected with the other, spring means for moving said part longitudinally to produce pivotal movement of said members, stops for limiting said pivotal movement of said members, and means for initiating movement of said members alternately from one of said stops to the other for disconnecting one of said means and connecting the other thereof to said spindle to reverse the rotation of said spindle.

2. In a machine having a rotary spindle provided with means for driving the same in opposite directions including control means for selectively connecting said driving means and spindle, the combination with said spindle driving means of a pivoted lever, a plunger mounted for movement on said lever longitudinally thereof, spring means for moving said plunger longitudinally on said lever, link means pivotally connecting said plunger and control means, stop means for limiting the pivotal movement of said lever, and means for moving said lever in opposite directions between said stop means to actuate said control means and reverse the direction of drive of said spindle.

3. In a machine having a rotary spindle provided with means for driving the same in opposite directions including control means for selectively connecting said driving means and spindle, the combination with said spindle driving means of a pivoted lever, a plunger mounted for movement on said lever longitudinally thereof, spring means for moving said plunger longitudinally on said lever, link means pivotally connecting said plunger and control means, stop means for limiting the pivotal movement of said lever, a pair of thrust elements provided with means for moving said lever in opposite directions, respectively, a dog for operating each of said elements, a rotary carrier on which said dogs are adjustably mounted and means for rotating said carrier.

4. In a machine having a rotary spindle provided with means for driving the same in opposite directions including control means for selectively connecting said driving means and spindle, the combination with said spindle driving means of a pivoted lever, a plunger mounted for movement on said lever longitudinally thereof, spring means for moving said plunger longitudinally of said lever, link means pivotally connecting said plunger and control means, stop means for limiting the pivotal movement of said lever, a pair of thrust elements provided with opposed cam surfaces for moving said lever, supporting means in which said elements are mounted for longitudinal actuating movement, spring means for moving each of said elements in one direction, a dog for moving each element in the opposite direction, a rotary carrier on which each of said dogs is mounted for peripheral adjustment, and means for rotating said carrier.

5. In a machine having a rotary spindle provided with means for driving the same in opposite directions, the combination with said spindle driving means of means for controlling the direction of rotation of said spindle comprising a lever, a link connected with said lever and provided with an abutment, a pair of longitudinally slidable elements having opposed cam faces for engaging said abutment, a rotary carrier, dogs for actuating said elements, respectively, mounted on said carrier for adjustment peripherally thereof and having overlapping engagement with each other to insure staggered position on said carrier and successive actuation of said elements, and means for rotating said carrier.

6. In a machine having a rotary spindle provided with means for driving the same in opposite directions, the combination with said spindle driving means of means for controlling the direction of rotation of said spindle comprising a shiftable lever, an abutment connected with said lever for shifting the same, a pair of longitudinally slidable thrust elements having opposed cam faces for engaging said abutment, spring means for moving each of said elements in one direction, and actuating means for alternately thrusting said elements longitudinally in the opposite direction to engage the cam face thereof with said abutment for shifting said lever in opposite directions.

7. In a machine having a rotary spindle provided with means for driving the same in opposite directions, the combination with said spindle driving means of means for controlling the direction of rotation of said spindle comprising a pivoted shipper lever, an abutment connected with said lever for shifting the same, a pair of longitudinally slidable thrust rods each provided with a cam face inclined to the axis thereof and opposed to the cam face of the other of said rods, for engaging said abutment, spring means for moving said rods in one direction, and means for moving said rods alternately in the opposite direction to engage said abutment and shift said lever in opposite directions.

8. In a machine having a rotary spindle provided with means for driving the same in opposite directions, the combination with said spindle driving means of means for controlling the direction of rotation of said spindle comprising a pivoted shipper lever, an abutment connected with said lever for shifting the same, a pair of longitudinally slidable thrust rods each provided with a cam face inclined to the axis thereof and opposed to the cam face of the other of said rods, for engaging said abutment, spring means for moving said rods in one direction, a pivoted arm for actuating each of said rods, a rotary carrier, dogs for actuating said arms, respectively, mounted on said carrier for adjustment peripherally thereof, and means for rotating said carrier and actuating said arms and rods for moving said shipper lever.

9. In a machine having a rotary spindle provided with means for driving the same in opposite directions, the combination with said spindle driving means of means for controlling the direction of rotation of said spindle comprising a pivoted shipper lever, an abutment connected with said lever for moving the same, a pair of thrust rods mounted for longitudinal sliding movement in a direction perpendicular to the pivotal axis of said shipper lever and having opposed cam faces for engaging said abutment, a rotary carrier, dogs on said carrier and adjustable peripherally thereof for actuating said rods, and means for rotating said carrier for alternately operating said rods to move said shipper lever in opposite directions.

10. In a machine having a rotary spindle provided with means for driving the same in opposite directions including a shipper lever for selectively connecting said means and spindle, the combination with said shipper lever of a link member pivoted thereto, a pivotally supported lever member, a part slidably mounted on one of said members and pivotally connected with the other, spring means for moving said part longitudinally to produce pivotal movement of said members, stops for limiting said pivotal movement, a link connected with said lever member and provided with an abutment, a pair of longitudinally slidable elements having opposed cam faces for engaging said abutment, spring means for moving each of said elements in one direction, and actuating means for alternately thrusting said elements longitudinally in the opposite direction to engage the cam face of each thereof with said abutment for shifting said lever member in opposite directions.

11. In a machine having a rotary spindle provided with means for rotating the same in opposite directions and control means for selectively connecting said driving means and spindle, the combination with said driving means of a pivoted lever, a plunger mounted for movement on said lever longitudinally thereof, spring means for moving said plunger longitudinally on said lever, link means pivotally connecting said plunger and control means, stop means for limiting the pivotal movement of said lever, a link connected with said lever and provided with an abutment, a pair of longitudinally slidable elements having opposed cam faces for engaging said abutment, a rotary carrier, dogs for actuating said elements, respectively, mounted on said carrier for adjustment peripherally thereof and having overlapping engagement with each other to insure staggered position on said carrier and successive actuation of said elements, and means for rotating said carrier.

12. In a machine having a rotary spindle provided with means for driving the same in opposite directions including control means for selectively connecting said means and spindle, the combination with said driving means of a pivoted lever, a plunger mounted for movement on said lever longitudinally thereof, spring means for moving said plunger longitudinally of said lever, link means pivotally connecting said plunger and control means, stop means for limiting the pivotal movement of said lever, a link pivotally connected with said lever and provided with an abutment, a pair of longitudinally slidable thrust rods having opposed cam faces for engaging said abutment, spring means for moving said rods in one direction, a rotary carrier, dogs adjustably mounted on said carrier for successively actuating said rods, and means for rotating said carrier for actuating said rods to move said control means in opposite directions.

FREDERICK G. SILVA.
WRAY S. SEYMOUR.